(12) United States Patent
Brita et al.

(10) Patent No.: US 11,267,910 B2
(45) Date of Patent: Mar. 8, 2022

(54) CATALYST COMPONENTS FOR THE POLYMERIZATION OF OLEFINS

(71) Applicant: BASELL POLIOLEFINE ITALIA S.R.L., Milan (IT)

(72) Inventors: Diego Brita, Ferrara (IT); Simona Guidotti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 232 days.

(21) Appl. No.: 16/613,655

(22) PCT Filed: May 9, 2018

(86) PCT No.: PCT/EP2018/062056
§ 371 (c)(1),
(2) Date: Nov. 14, 2019

(87) PCT Pub. No.: WO2018/210665
PCT Pub. Date: Nov. 22, 2018

(65) Prior Publication Data
US 2021/0087307 A1    Mar. 25, 2021

(30) Foreign Application Priority Data

May 18, 2017 (EP) ..................................... 17171676

(51) Int. Cl.
*C08F 4/654* (2006.01)
*C08F 4/655* (2006.01)
*C08F 10/06* (2006.01)
*C08F 4/02* (2006.01)
*C08F 4/16* (2006.01)

(52) U.S. Cl.
CPC .............. *C08F 10/06* (2013.01); *C08F 4/022* (2013.01); *C08F 4/16* (2013.01)

(58) Field of Classification Search
CPC ........ C08F 4/6543; C08F 4/656; C08F 10/00; C08F 4/655
See application file for complete search history.

(56) References Cited

U.S. PATENT DOCUMENTS

| 4,861,846 A | 8/1989 | Cann et al. |
| 2005/0227858 A1 | 10/2005 | Chen et al. |
| 2006/0046927 A1 | 3/2006 | Klendworth et al. |

FOREIGN PATENT DOCUMENTS

| EP | 1229054 A1 | 8/2002 |
| EP | 1666505 A1 | 6/2006 |
| KR | 20170053646 A | 5/2017 |
| WO | 2016038570 A2 | 3/2016 |

OTHER PUBLICATIONS

International Search Report and Written Opinion dated Jul. 27, 2018 (Jul. 27, 2018) for Corresponding PCT/EP2018/062056.

*Primary Examiner* — Caixia Lu

(57) ABSTRACT

A catalyst mixture made from or containing (a) particles of a solid catalyst component comprising Ti, Mg, Cl, and (b) from 0.5 to 5.0% by weight, based upon the total weight of the mixture, of particles of a solid compound having particle size ranging from 0.1 µm to 1 mm containing more than 50% by weight of $SiO_2$ units.

15 Claims, No Drawings

CATALYST COMPONENTS FOR THE POLYMERIZATION OF OLEFINS

This application is the U.S. National Phase of PCT International Application PCT/EP2018/062056, filed May 9, 2018, claiming benefit of priority to European Patent Application No. 17171676.4, filed May 18, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the homopolymerization or copolymerization of olefins, catalysts obtained from the catalyst components, and the use of the catalysts in processes for the homopolymerization or copolymerization of olefins.

BACKGROUND OF THE INVENTION

In some instances, Ziegler-Natta catalyst components are used for the stereospecific polymerization of olefins, such as propylene. In some instances, the catalysts were made from or contains solid $TiCl_3$ obtained by the reduction of $TiCl_4$ with aluminum alkyl compounds and the resulting polymers was subjected to a de-ashing treatment to remove the catalyst residues as well as to a washing step to remove atactic polymer. In some instances, catalysts are made from or contain a solid catalyst component made from or containing a magnesium dihalide and one or more of a supported titanium compound, an internal electron donor compound, and an Al-alkyl compound as a cocatalyst.

In some polymerization techniques, the particle size of the catalyst ranges from about 5 to about 200 µm. In some instances, this size range presents cohesiveness problems, which are believed to worsen flowability and decrease the homogeneous distribution of the catalyst particles in the reactor.

In some processes, slip agents such as stearates or erucamide are employed. In some instances, the catalyst or carrier particles are coated with a layer of nanoparticles made of conductive material, such as carbon black. In some instances, a step for the preparation of a gel made from or containing the nanoparticles is performed. In some instances, it is believed that an additional layer prevents interaction between the catalytically active metal(s) and the carriers. In some instance, it is believed that a water-based nanoparticles gel, can inactivates the Ti based catalyst.

SUMMARY OF THE INVENTION

In a general embodiment, the present disclosure provides a catalyst mixture made from or containing a mechanical mixture of (a) particles of a solid catalyst component made from or containing titanium (Ti), magnesium (Mg), and chloride (Cl), and (b) from 0.2 to 5.0% by weight, based upon the total weight of the mixture, of particles of a solid compound having a particle size ranging from 0.1 µm to 1 mm and containing more than 50% by weight of $SiO_2$ units.

DETAILED DESCRIPTION OF THE INVENTION

As used herein, the term "mechanical mixture" indicates that the particles of solid catalyst component (a) are distinct and separated from those particles of solid compound (b). The particles of catalyst component (a) and the particles of compound (b) are brought in close proximity by mechanic mixing.

In some embodiments, the inorganic solid compound (b) has particle size ranging from 2 to 800 µm, alternatively from 1 to 100 µm, alternatively from 1 to 30 µm.

In some embodiments, the solid compound b) containing more than 50% by weight of $SiO_2$ units is selected from the group consisting of silica, silicates, diatomaceous earth, and mixtures thereof. In some embodiments, the silicates are phyllosilicates, alternatively talc. In some embodiments, the silica is a hydrophilic silica. In some embodiments, the hydrophilic silica is a silica that has not been modified to be made hydrophobic. In some embodiments, the silica is a crystalline silica. In some embodiment, the crystalline silica has a size from 0.1 to 5 µm. As used herein, the term "crystalline silica" refers to a silica based material showing an X-ray spectra with reflections similar to reflections of quartz or cristobalite.

In some embodiments, the solid compound b) containing more than 50% by weight of $SiO_2$ units is diatomaceous earth.

In some embodiments, the particle size of the solid catalyst component ranges from 4 to 120 µm, alternatively from 8 to 100 µm, alternatively from 10 to 90 µm.

In some embodiments, the amount of particles of solid compound (b) ranges from 0.5 to 5% by weight, alternatively from 0.75 to 4% by weight, alternatively from 1 to 3% by weight, based on the total weight of catalyst mixture (a)+(b).

In some embodiments, the solid catalyst component is granular, spheroidal irregular or spherical regular morphology.

In some embodiments, granular or otherwise irregular catalyst particles are obtained by reacting Ti-halides with precursors of the formula $MgX_n(OR)_{2-n}$ wherein X is Cl or a $C_1$-$C_{10}$ hydrocarbon group, R is a $C_1$-$C_8$ alkyl group and n ranges from 0 to 2. In some embodiments, a reaction generates solid particles made of or containing $MgCl_2$ on which a Ti compound is fixed.

In some embodiments, catalysts components having a spherical morphology are obtained by reacting Ti-halides with precursors made from or containing adducts of formula $MgCl_2(R^1OH)_n$ where $R^1$ is a $C_1$-$C_8$ alkyl group, alternatively ethyl, and n is from 2 to 6.

In some embodiments, the solid catalyst components have a prevailing spherical shape. In some embodiments, the solid catalyst components have a sphericity factor higher than 0.60, alternatively higher than 0.70. As used herein, the sphericity factor is calculated using the image analysis technique described as follows in the characterization section.

In some embodiments, the solid catalyst component has a sphericity factor higher than 0.7 and a particle size ranging from 10 to 90 µm.

In some embodiments, the amount of Mg in the solid catalyst component ranges from 8 to 30% by weight, alternatively from 10 to 25% wt.

In some embodiments, the amount of Ti ranges from 0.1 to 8% by weight, alternatively from 0.5 to 5% by weight, alternatively from 0.7 to 3% wt.

In some embodiments, the titanium atoms are part of titanium compounds of formula $Ti(OR^2)_nX_{4-n}$ wherein n is between 0 and 4; X is halogen and $R^2$ is a hydrocarbon radical, alternatively alkyl, radical having 1-10 carbon atoms. In some embodiments, the titanium compounds have at least one Ti-halogen bond such as titanium tetrahalides or halogen alcoholates. In some embodiments, the titanium compounds are selected from the group consisting of $TiCl_4$, and $Ti(OEt)Cl_3$. In some embodiments, the catalyst components are further made from or contain an electron donor compound (internal donor). In some embodiments, the electron donor compound is selected from esters, ethers, amines, silanes, carbamates and ketones and mixtures thereof.

In some embodiment and to yield an increased stereo-specificity of the catalyst, the internal donor is selected from the group consisting of alkyl and aryl esters of optionally substituted aromatic mono or polycarboxylic acids. In some embodiments, the esters are esters of benzoic and phthalic acids. In some embodiments, the esters are esters of aliphatic acids selected from the group consisting of malonic, glutaric, maleic and succinic acids. In some embodiments, the esters are selected from the group consisting of n-butylphthalate, di-isobutylphthalate, di-n-octylphthalate, ethyl-benzoate and p-ethoxy ethyl-benzoate. In some embodiments, the esters are selected from the diesters described in Patent Cooperation Treaty Publication No. WO2010/078494 and U.S. Pat. No. 7,388,061. In some embodiments, the esters are selected from the group consisting of 2,4-pentanediol dibenzoate derivatives and 3-methyl-5-t-butyl catechol dibenzoates. In some embodiments, the internal donor is a diol derivative selected from the group consisting of dicarbamates, monoesters monocarbamates and monoesters monocarbonates. In some embodiments, the internal donor is selected from the group of 1,3 diethers of the formula:

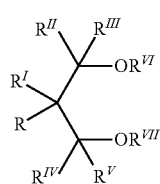

(I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of $R$-$R^V$ except that $R^{VI}$ and $R^{VII}$ cannot be hydrogen. In some embodiments, one or more of the $R$-$R^{VII}$ groups are linked to form a cycle. In some embodiments, the 1,3-diethers have $R^{VI}$ and $R^{VII}$ selected from $C_1$-$C_4$ alkyl radicals.

In some embodiments, mixtures of the donors are used. In some embodiments, the mixtures are made from or contain esters of succinic acids and 1,3 diethers as described in Patent Cooperation Treaty Publication No. WO2011/061134.

In some embodiments and to increase the capability of the catalyst to distribute an olefin co-monomer within a polymer chain, the electron donor is selected from monofunctional donors, alternatively ethers and esters. In some embodiments, the ethers are $C_2$-$C_{20}$ aliphatic ethers, alternatively cyclic ethers, alternatively cyclic ethers having 3-5 carbon atoms cyclic ethers, alternatively selected from the group consisting of tetrahydrofuran and dioxane. In some embodiments, the ether is tetrahydrofuran. In some embodiments, the esters are $C_1$-$C_4$ alkyl esters of aliphatic mono carboxylic acids. In some embodiments, the esters are selected from the group consisting of ethylacetate and methyl formiate. In some embodiments, the ester is ethylacetate.

In some embodiments, the final amount of electron donor compound in the solid catalyst component ranges from 0.5 to 40% by weight, alternatively from 1 to 35% by weight.

In some embodiments, the preparation of the solid catalyst component includes the reaction between magnesium alcoholates or chloroalcoholates and an excess of $TiCl_4$ in the presence of the electron donor compounds at a temperature of about 80 to 120° C. In some embodiments, the chloroalcoholates are prepared according to U.S. Pat. No. 4,220,554. In some embodiments, the solid catalyst component is prepared by reacting a titanium compound of formula $Ti(OR^2)m$-$yX_y$, where m is the valence of titanium and y is a number between 1 and m and $R^2$ has the same meaning as previously disclosed herein, with a magnesium chloride deriving from an adduct of formula $MgCl_2 \cdot pR^3OH$, where p is a number between 0.1 and 6, alternatively from 2 to 3.5, and $R^3$ is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts are as disclosed in U.S. Pat. Nos. 4,399,054 and 4,469,648. In some embodiments, the adduct is directly reacted with Ti compound or subjected to thermal controlled dealcoholation (at a temperature in a range of about 80-130° C.), thereby obtaining an adduct in which the number of moles of alcohol is lower than 3, alternatively between 0.1 and 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the temperature of the cold $TiCl_4$ is about 0° C. In some embodiments, the treatment with $TiCl_4$ is carried out one or more times. In some embodiments, the electron donor compound is added during the treatment with $TiCl_4$. In some embodiments, the preparation of catalyst components in spherical form occurs as described in European Patent Applications EP-A-395083, EP-A-553805, EP-A-553806, EP-A-601525 or Patent Cooperation Treaty Publication No. WO98/44009.

In some embodiments, the catalyst mixture made from or containing the particles made of solid catalyst component (a) and the particles (b) made of the $SiO_2$ unit based compound, is prepared with dry blending the two solids. In some embodiments, the dry blending is carried out at room temperature for a time ranging from 0.2 to 20 hours, alternatively from 0.5 to 15 hours, alternatively from 0.5 to 5 hours in a nitrogen environment.

In some embodiments, the mixture is prepared by stirring a liquid hydrocarbon slurry of the particles (a) and (b) and afterwards removing the liquid phase followed by drying the particles.

In some embodiments, the solid catalyst components are converted into catalysts for the polymerization of olefins by reacting the solid catalyst components with organoaluminum compounds.

In some embodiments, a catalyst for the polymerization of olefins $CH_2$=$CHR$ is provided, wherein R is a hydrocarbyl radical with 1-12 carbon atoms, optionally in mixture with ethylene, made from or containing the product obtained by contacting:

(i) the solid catalyst component and
(ii) an alkylaluminum compound and,
(iii) an external electron donor compound.

In some embodiments, the alkyl-Al compound (ii) is the trialkyl aluminum compound. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the alkyl-Al compound (ii) is selected from alkylaluminum halides, alkylaluminum hydrides and alkylaluminum sesquichlorides or mixtures with trialkylaluminums. In some embodiments, the alkyl-aluminum sesquichlorides is $AlEt_2Cl$ or $Al_2Et_3Cl_3$.

In some embodiments, the Al/Ti ratio is higher than 1, alternatively between 50 and 2000.

In some embodiments, the external electron-donor compounds are selected from the group consisting of silicon compounds, ethers, esters, amines, heterocyclic compounds and ketones. In some embodiments, the external electron-donor compound is 2,2,6,6-tetramethylpiperidine.

In some embodiments, the external donor compounds are silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$ are alkyl, cycloalkyl or aryl radicals with 1-18 carbon atoms optionally containing heteroatoms. In some embodiments, the external electron-donor compounds are silicon compounds wherein a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane. In some embodiments, the external electron-donor compounds are silicon compounds wherein a is 0, c is 3, $R_7$ is a branched alkyl or cycloalkyl group, optionally containing heteroatoms. In some embodiments, $R_8$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in an amount to give a molar ratio between the alkylaluminum compound (ii) and the electron donor compound (iii) of from 0.1 to 500, alternatively from 1 to 300, alternatively from 3 to 100.

In some embodiments, a process for the homopolymerization or copolymerization of olefins $CH_2$=CHR is provided, wherein R is hydrogen or a hydrocarbyl radical with 1-12 carbon atoms, carried out in the presence of a catalyst made from or containing the product of the reaction between:
(i) the solid catalyst component;
(ii) an alkylaluminum compound and,
(iii) optionally an electron-donor compound (external donor).

In some embodiments, the polymerization process is carried out by slurry polymerization using as diluent an inert hydrocarbon solvent or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization process is carried out at temperature of from 20 to 120° C., alternatively from 40 to 80° C. In some embodiments, the polymerization is carried out in gas-phase and an operating pressure is ranges from 0.5 and 5 MPa, alternatively from 1 to 4 MPa. In some embodiments, the bulk polymerization has an operating pressure in the range from 1 to 8 MPa, alternatively from 1.5 to 5 MPa.

The following examples are given in order to better illustrate the disclosure without limiting the disclosure.

Examples

Determination of X.I.

2.5 g of polymer and 250 ml of o-xylene were placed in a round-bottomed flask provided with a cooler and a reflux condenser and kept under nitrogen. The mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Average Particle Size

Determined by a method based on the principle of the optical diffraction of monochromatic laser light with the "Malvern Instruments 2000" apparatus. The average size is given as P50. P10 and P90 are also determined with this method.

The particle size distribution (SPAN) is calculated with the formula $$\frac{P90 - P10}{P50}$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

The Malvern Mastersizer 2000 particle size analyzer is divided into three units:
1) an optical unit; Optical core unit for measurements of solids of sizes ranging from 0.02 to 2000μ, equipped with two laser beam sources: red He/Ne laser, power 5 mw, wavelength 633 nm, blue (diode) laser, wavelength 450 nm.
2) a sampling Unit; Hidro 2000S automatic Sampling Unit for volumes between 50 and 120 ml, operating with internal capacity, centrifuge pump, stirrer and ultrasound probe with 40 W power output.
3) a PC console; Portable LG Pentium series, using Malvern Professional software for Windows 2000 or NT. Method of data elaboration using Mie optics theory (Refractive Index for sample=1.596; Refractive Index for n-heptane=1.39).

Method Description

For the measurements described herein, n-heptane (plus 2 g/l antistatic Span 80) is used as dispersing agent.

The Measuring cell is loaded with dispersing agent, while pump/agitator speed is set up to 2205 RPM. Background measurement is then taken. Then sample is loaded. Before being subject to PS Determination, the sample undergoes 30 seconds of ultrasound treatment. After that, the measurement is taken.

Determination of Break Energy and Avalanche Energy

Measurements were carried out with a Revolution Powder Analyzer (Mercury Scientific Inc., Newtown, Conn., USA). Specific measurement conditions were provided in the User Manual, revised on Aug. 30, 2014.

Determination of Sphericity Factor

The determination was carried out with the image analyzer software Analysis Pro 3.2 which describes the sphericity of a particle using an algorithm applied to a source of image constituted by a SEM picture. The dimension is selected based on the average size of the catalyst particle, thereby including a statistically representative number of particles. For the catalyst sample having average particle size of 70 µm, the size of the picture was 2.5×2.5 mm. For the catalyst sample having particle size of about 9 µm, the size of the picture was 150 µm×150 µm.

Examples

Procedure for the Preparation of the Spherical Adduct

An initial amount of microspheroidal $MgCl_2.2.8C_2H_5OH$ was prepared according to the method described in Example 2 of U.S. Pat. No. 4,399,054 but operating at 3,000 rpm instead of 10,000. The adduct had an average particle size of 70 µm and subjected to thermal dealcoholation at increasing temperatures from 30 to 130° C. in nitrogen current until the alcohol content is about 42% wt.

Procedure for the preparation of the spherical solid catalyst component Three lots of solid catalyst component were prepared. Into a 500 ml round bottom flask, equipped with mechanical stirrer, cooler and thermometer 300 ml of $TiCl_4$ were introduced at room temperature under nitrogen atmosphere. After cooling to 0° C., while stirring, diisobutylphthalate and 9.0 g of the spherical adduct were sequentially added into the flask. The amount of charged internal donor was to meet a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The solid was then dried under vacuum and characterized. The sphericity factor was 0.77 for the lot A, 0.79 for Lot B, and 0.75 for Lot C.

The propylene polymerization test for catalyst Lot A produced PP with a catalyst activity of 23 kg/gcat and 97.1% of Xylene insolubility.

Procedure for the Polymerization of Propylene

A 4 liter (L) steel autoclave equipped with a stirrer, pressure gauge, thermometer, catalyst feeding system, monomer feeding lines and thermostatic jacket, was used. The reactor was charged with 0.01 grams. of solid catalyst component 0.76 g of TEAL, 0.063 grams of cycloexylmethyldimethoxy silane, 3.21 of propylene, and 2.01 of hydrogen. The system was heated to 70° C. over 10 min. under stirring, and maintained under these conditions for 120 min. At the end of the polymerization, the polymer was recovered by removing any unreacted monomers and dried under vacuum.

The autoclave was closed and hydrogen was added (2 NL in D donor tests, 1.5 NL in C donor tests and 1.25 NL in tests without external donor were used). Then, under stirring, 1.2 kg of liquid propylene was fed into the reaction. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. The resulting polymer was weighed and characterized.

EXAMPLES

Examples 1-4 and Comparative Example 1

A series of four mixtures was prepared by dry mixing the lot A of the solid catalyst component with the specific amount reported in Table 1 of Celite® a diatomeaceous earth commercially available from Sigma-Aldrich having mean particle size of 22 µm. The blending was carried out as follows. 100 grams of the solid catalyst component were introduced in a 1 L glass bottle and then, the amount of Celite® reported in Table 1 was added.

The solids were mixed by tumbling the bottle for 1 h at 60 rpm.

The resulting mixtures were subject to energy break and avalanche energy determination and the results are reported in Table 1. A polymerization test for the mixtures of Examples 1 and 2 was carried out. The propylene polymerization test for catalyst Example 1 produced PP with a catalyst activity of 25 kg/gcat and 96.9% of xylene insolubility while the test for Example 2 produced PP with a catalyst activity of 23 kg/gcat and 96.9% of xylene insolubility.

Examples 5-18 and Comparative Examples 2-5

The mixture were prepared as described in Examples 1-4 with the difference that Lot B was used instead of Lot A and $SiO_2$ based unit compounds reported in Table 1 were used instead of Celite®.

Silica S5631 having mean particle 0.9 µm (commercially available from Fluka).

Silica S342890 having mean particle 10 µm (commercially available from Sigma-Aldrich).

Silica S342831 having more than 90% of particles with size of greater than 800 µm was commercially available from Sigma-Aldrich.

Gasil AB 200DF is commercialized by PQ corporation. It is an amorphous silica with P50 size of 5 µm.

Gasil AB 735 is commercialized by PQ corporation. It is an amorphous silica with P50 size of 3 µm.

Comparative Examples 7-9

The mixture were prepared as described in Examples 1-4 with the difference that Lot C was used instead of Lot A and the slip agents reported in Table 1 were used instead of Celite®.

Examples 14-15 and Comparative Example 10

The mixtures were prepared as described in Examples 1-4 with the difference that the solid catalyst component was of a granular type prepared as described in Example 1 of U.S. Pat. No. 7,759,445 (having a sphericity factor of 0.55) were tested for energy break and avalanche energy determination and the results are reported in Table 1.

TABLE 1

| Ex. | Catalyst Lot/ Sphericity Factor | Additional compound Type. | Amount % wt. | Break Energy Kj/Kg. | % Impr. | Avalanche energy Kj/Kg. | % Impr. |
|---|---|---|---|---|---|---|---|
| C1 | A/0.77 | — | — | 69.3 | — | 24.5 | — |
| 1 | " | Celite | 0.5 | 58.2 | 16 | 19 | 22 |
| 2 | " | " | 1 | 46.7 | 33 | 14 | 43 |
| 3 | " | " | 2 | 44.5 | 26 | 16.3 | 33 |
| 4 | " | " | 3 | 49.3 | 29 | 10.4 | 58 |
| C2 | B/0.79 | — | — | 49.6 | | 16.3 | |
| 5 | " | S5631 | 0.25 | 21.8 | 56 | 9 | 45 |
| 6 | " | | 0.75 | 28.8 | 42 | 7.5 | 54 |
| 7 | " | | 1 | 28.7 | 42 | 7.3 | 55 |
| 8 | " | | 2 | 33.2 | 33 | 9.3 | 43 |
| 9 | " | | 3 | 36.2 | 27 | 9.8 | 40 |
| 10 | " | Silica 342890 | 1 | 26.7 | 46 | 6.6 | 60% |
| 11 | " | " | 2 | 39 | 21 | 8 | 51% |
| 12 | " | Silica 342831 | 2 | 42 | 15 | 15 | 8% |
| 13 | | Talc | 0.5 | 32.4 | 35% | 10.7 | 34% |
| 14 | | Gasil AB200df | 1 | 41 | 17% | 9.4 | 42% |
| 15 | | " | 2 | 43 | 13% | 9.8 | 40% |
| 16 | | Gasil AB735 | 1 | 44 | 11 | 8.8 | 46 |
| 17 | | | 2 | 38 | 23 | 10.6 | 35 |
| 18 | | | 3 | 34 | 31 | 10 | 39 |
| C3 | | Starch | 1 | 47 | 5% | 17.8 | −9% |
| C4 | | Erucamide | 1 | 52 | −5% | 17 | −4% |
| C5 | | " | 2 | 55 | −11% | 19 | −17% |
| C7 | C/0.75 | — | — | 45.5 | — | 14.7 | — |

| Ex. | Catalyst Lot/ Sphericity Factor | Additional compound Type | Amount | Break Energy | % Impr. | Avalanche energy | % Impr. |
|---|---|---|---|---|---|---|---|
| | | Ca Stearate | 1 | 70.1 | −54% | 29.9 | −103% |
| | | " | 2 | 65 | −43% | 24.9 | −69% |
| C8 | | Mg Stearate | 1 | 57.7 | −27% | 22 | −50% |
| C9 | | " | 2 | 54.7 | −20% | 21 | −43% |
| C10 | 0.55 | — | | 88 | | 22 | |
| 14 | " | Celite | 1 | 78.1 | 11 | 19.0 | 13% |
| 15 | " | " | 2 | 73.5 | 16 | 20.0 | 9% |

What is claimed is:

1. A catalyst mixture comprising:
a mechanical mixture of
(a) particles of a solid catalyst component comprising titanium (Ti), magnesium (Mg), and chloride (Cl), and
(b) from 0.2 to 5.0% by weight, based upon the total weight of the catalyst mixture (a)+(b), of particles of a solid compound having a particle size ranging from 0.1 μm to 1 mm and containing more than 50% by weight of $SiO_2$ units.

2. The catalyst mixture of claim 1 wherein the solid compound (b) containing more than 50% by weight of $SiO_2$ units is selected from the group consisting of silica, silicates, diatomaceous earth, and a combination thereof.

3. The catalyst mixture of claim 2 wherein the solid compound (b) containing more than 50% by weight of $SiO_2$ units is a silicate selected from phyllosilicates.

4. The catalyst mixture of claim 3 wherein the phyllosilicate is talc.

5. The catalyst mixture of claim 1 wherein the solid compound (b) has particle size ranging from 2 to 800 μm.

6. The catalyst mixture of claim 1 wherein the solid compound (b) containing more than 50% by weight of $SiO_2$ units is a silica.

7. The catalyst mixture of claim 6 wherein the silica is crystalline silica.

8. The catalyst mixture of claim 7 wherein the crystalline silica has a particle size ranging from 0.1 to 5 μm.

9. The catalyst mixture of claim 1 wherein the particle size of the solid catalyst component (a) ranges from 4 to 120 μm.

10. The catalyst mixture of claim 9 wherein the solid catalyst component (a) has a sphericity factor higher than 0.60.

11. The catalyst mixture of claim 10 wherein the solid catalyst component (a) has a sphericity factor higher than 0.7 and a particle size ranging from 10 to 90 μm.

12. The catalyst mixture according to claim 1, wherein the amount of particles of solid compound (b) ranges from 0.5 to 5% wt, based on the total weight of catalyst mixture (a)+(b).

13. The catalyst mixture of claim 1, wherein the solid catalyst component (a) further comprises an electron donor selected from the group consisting of esters, ethers, amines, silanes, carbamates and ketones and mixtures thereof.

14. A catalyst system for the homopolymerization or copolymerization of olefins $CH_2$=CHR, wherein R is hydrogen or a hydrocarbyl radical with 1-12 carbon atoms, comprising:
the product obtained by contacting:
(i) the catalyst mixture according to claim 1;
(ii) an alkylaluminum compound and,
(iii) optionally an external electron donor compound.

15. A process for the homopolymerization or copolymerization of olefins $CH_2$=CHR, wherein R is hydrogen or a hydrocarbyl radical with 1-12 carbon atoms, carried out in the presence of the catalyst system according to claim 14.

\* \* \* \* \*